US012598262B2

(12) United States Patent
Arai

(10) Patent No.: US 12,598,262 B2
(45) Date of Patent: Apr. 7, 2026

(54) MEDIUM CONVEYING APPARATUS FOR GENERATING IMAGE BASED ON PULSE SIGNAL WHOSE CYCLE VARIES ACCORDING TO ROTATION OF DC MOTOR

(71) Applicant: PFU LIMITED, Kahoku (JP)

(72) Inventor: Yuta Arai, Kahoku (JP)

(73) Assignee: PFU LIMITED, Kahoku (JP)

( * ) Notice: Subject to any disclaimer, the term of this patent is extended or adjusted under 35 U.S.C. 154(b) by 183 days.

(21) Appl. No.: 18/651,547

(22) Filed: Apr. 30, 2024

(65) Prior Publication Data

US 2024/0283880 A1      Aug. 22, 2024

Related U.S. Application Data

(63) Continuation of application No. 17/096,791, filed on Nov. 12, 2020, now Pat. No. 12,003,679.

(30) Foreign Application Priority Data

Dec. 19, 2019     (JP) ................................. 2019-229606

(51) Int. Cl.
*H04N 1/00*          (2006.01)
*B65H 5/06*          (2006.01)
*H04N 1/047*         (2006.01)
(52) U.S. Cl.
CPC ......... *H04N 1/00933* (2013.01); *B65H 5/062* (2013.01); *H04N 1/0473* (2013.01);
(Continued)
(58) Field of Classification Search
CPC ............. H04N 1/00933; H04N 1/0473; H04N 1/0476; H04N 1/053; H04N 1/047;
(Continued)

(56) References Cited

U.S. PATENT DOCUMENTS 5,267,059 A * 11/1993 Kawabata ............ H04N 1/0057
                                                    358/496
12,003,679 B2 * 6/2024 Arai ..................... H04N 1/0473
2013/0134665 A1    5/2013 Asano et al.

FOREIGN PATENT DOCUMENTS

JP          58-96454 A      6/1983
JP          3-26051 A       2/1991
           (Continued)

OTHER PUBLICATIONS

Japanese Office Action dated Jun. 13, 2023 regarding Japanese Patent Application No. 2019-229606 corresponding to U.S. Appl. No. 17/096,791 (2 pages) with English Translation (4 pages).
(Continued)

*Primary Examiner* — Jeremy R Severson
(74) *Attorney, Agent, or Firm* — Womble Bond Dickinson (US) LLP

(57) ABSTRACT

A medium conveying apparatus includes a conveyance roller to convey a medium, a DC motor to drive the conveyance roller, a processor to rotate the DC motor, an encoder to output a first pulse signal whose cycle varies according to a rotation speed of the DC motor, and an imaging device to acquire an image acquired by imaging a conveyed medium in response to a pulse of a second pulse signal whose cycle is constant. The processor detects a number of pulses of the second pulse signal included in a predetermined cycle of the first pulse signal, and discards images acquired by the imaging device in the same number of pulses as difference between the detected number of pulses and a reference number, in a next cycle of the predetermined cycle of the first pulse signal, when the detected number of pulses exceeds the reference number.

20 Claims, 13 Drawing Sheets

(52) U.S. Cl.
CPC ...... *B65H 2402/46* (2013.01); *B65H 2513/10* (2013.01); *B65H 2553/51* (2013.01); *B65H 2555/25* (2013.01); *B65H 2557/33* (2013.01); *B65H 2801/39* (2013.01)

(58) Field of Classification Search
CPC ............ B65H 2513/10; B65H 2553/51; B65H 2555/25; B65H 2557/33; B65H 2801/39
See application file for complete search history.

(56)     References Cited

FOREIGN PATENT DOCUMENTS

| | | | |
|---|---|---|---|
| JP | H04-860 | A | 1/1992 |
| JP | 6-54132 | A | 2/1994 |
| JP | H08-225239 | A | 9/1996 |
| JP | 2002-232656 | A | 8/2002 |
| JP | 2010-135964 | A | 6/2010 |
| JP | 2013-136454 | A | 7/2013 |
| JP | 2014-030129 | A | 2/2014 |

OTHER PUBLICATIONS

Japanese Office Action dated Aug. 13, 2024 regarding Japanese Patent Application No. 2023-188787 corresponding to U.S. Appl. No. 18/651,547 (3 pages) with English Translation (5 pages).

* cited by examiner

MEDIUM CONVEYING APPARATUS FOR GENERATING IMAGE BASED ON PULSE SIGNAL WHOSE CYCLE VARIES ACCORDING TO ROTATION OF DC MOTOR

CROSS-REFERENCE TO RELATED APPLICATIONS

This is a Continuation Application of U.S. patent application Ser. No. 17/096,791. Filed Nov. 12, 2020, which claims priority to and benefit of priority of prior Japanese Patent Application No. 2019-229606, filed on Dec. 19, 2019, the entire contents of which are incorporated herein by reference.

TECHNICAL FIELD

Embodiments discussed in the present specification relate to medium conveyance.

BACKGROUND

In a medium conveying apparatus such as a scanner, a DC motor may be used as a motor for conveying a medium. The DC motor is low cost and can easily adjust the speed. However, the rotation speed varies by an external factor such as a load variation. Therefore, in an image acquired by imaging the conveyed medium, an inter-lengthening in the sub-scanning direction may occur.

An image reading apparatus in which a feed roller is rotatably driven by a DC motor to continuously feed a document in a conveyance path, and sequentially transfer and store one page of data read by an image sensor to a line buffer by one line, is disclosed (Japanese Unexamined Patent Publication (Kokai) No. H6-54132). The image reading apparatus performs a reading operation by an image sensor every time a photo interrupter located to face a part of a disc mounted to be integrally rotatable to a rotation shaft of the DC motor detects a through hole provided in the disc and outputs a detection signal.

SUMMARY

According to some embodiments, a medium conveying apparatus includes a conveyance roller to convey a medium, a DC motor to drive the conveyance roller, a processor to rotate the DC motor, an encoder to output a first pulse signal whose cycle varies according to a rotation speed of the DC motor, and an imaging device to acquire an image acquired by imaging a conveyed medium in response to a pulse of a second pulse signal whose cycle is constant. The processor detects a number of pulses of the second pulse signal included in a predetermined cycle of the first pulse signal, and discards images acquired by the imaging device in the same number of pulses as difference between the detected number of pulses and a reference number, in a next cycle of the predetermined cycle of the first pulse signal, when the detected number of pulses exceeds the reference number.

According to some embodiments, a medium conveying apparatus includes a conveyance roller to convey a medium, a DC motor to drive the conveyance roller, a processor to rotate the DC motor, an encoder to output a first pulse signal whose cycle varies according to a rotation speed of the DC motor, and an imaging device to acquire an image acquired by imaging a conveyed medium in response to a pulse of a second pulse signal whose cycle is constant. The processor detects a number of pulses of the second pulse signal included in a predetermined cycle of the first pulse signal, and generates an input image using images acquired by the imaging device in a reference number of pulses, among images acquired by the imaging device in a next cycle of the predetermined cycle of the first pulse signal, when the detected number of pulses exceeds the reference number.

According to some embodiments, a method for generating an image includes conveying a medium by a conveyance roller, driving the conveyance roller by a DC motor, rotating the DC motor, outputting a first pulse signal whose cycle varies according to a rotation speed of the DC motor by an encoder, acquiring an image acquired by imaging a conveyed medium in response to a pulse of a second pulse signal whose cycle is constant by an imaging device, detecting a number of pulses of the second pulse signal included in a predetermined cycle of the first pulse signal, and discarding images acquired by the imaging device in the same number of pulses as difference between the detected number of pulses and a reference number, in a next cycle of the predetermined cycle of the first pulse signal, when the detected number of pulses exceeds the reference number.

According to some embodiments, a method for generating an image includes conveying a medium by a conveyance roller, driving the conveyance roller by a DC motor, rotating the DC motor, outputting a first pulse signal whose cycle varies according to a rotation speed of the DC motor by an encoder, acquiring an image acquired by imaging a conveyed medium in response to a pulse of a second pulse signal whose cycle is constant by an imaging device, detecting a number of pulses of the second pulse signal included in a predetermined cycle of the first pulse signal, and generating an input image using images acquired by the imaging device in a reference number of pulses, among images acquired by the imaging device in a next cycle of the predetermined cycle of the first pulse signal, when the detected number of pulses exceeds the reference number.

According to some embodiments, a computer-readable, non-transitory medium stores a computer program. The computer program causes a medium conveying apparatus including a conveyance roller to convey a medium, a DC motor to drive the conveyance roller, an encoder to output a first pulse signal whose cycle varies according to a rotation speed of the DC motor, and an imaging device to acquire an image acquired by imaging a conveyed medium in response to a pulse of a second pulse signal whose cycle is constant, to execute a process including rotating the DC motor, detecting a number of pulses of the second pulse signal included in a predetermined cycle of the first pulse signal, and discarding images acquired by the imaging device in the same number of pulses as difference between the detected number of pulses and a reference number, in a next cycle of the predetermined cycle of the first pulse signal, when the detected number of pulses exceeds the reference number.

According to some embodiments, a computer-readable, non-transitory medium stores a computer program. The computer program causes a medium conveying apparatus including a conveyance roller to convey a medium, a DC motor to drive the conveyance roller, an encoder to output a first pulse signal whose cycle varies according to a rotation speed of the DC motor, and an imaging device to acquire an image acquired by imaging a conveyed medium in response to a pulse of a second pulse signal whose cycle is constant, to execute a process including rotating the DC motor, detecting a number of pulses of the second pulse signal included in a predetermined cycle of the first pulse signal, and generating an input image using images acquired by the imaging device in a reference number of pulses, among images acquired by the imaging device in a next cycle of the predetermined cycle of the first pulse signal, when the detected number of pulses exceeds the reference number.

BRIEF DESCRIPTION OF DRAWINGS

FIG. 10 is a graph showing a relationship between the first pulse signal and the second pulse signal.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
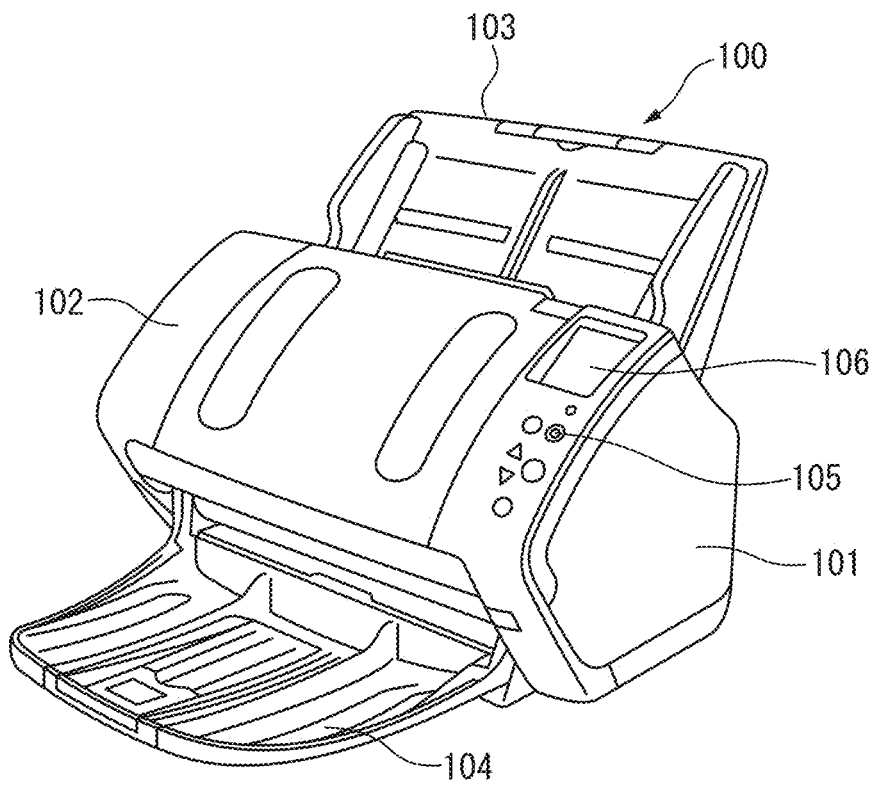
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. The medium is a thin medium, such as a paper, or a thick medium, such as a thick paper, a card, a booklet or a passport. The medium conveying apparatus 100 may be a fax machine, a copying machine, a multifunctional peripheral (MFP), etc. A conveyed medium may not be a document but may be an object being printed on etc., and the medium conveying apparatus 100 may be a printer etc.

The medium conveying apparatus 100 includes a lower housing 101, an upper housing 102, a medium tray 103, an ejection tray 104, an operation device 105, and a display device 106.

The upper housing 102 is located at a position covering the upper surface of the medium conveying device 100 and is engaged with the lower housing 101 by hinges so as to be opened and closed at a time of medium jam, during cleaning the inside of the medium conveying device 100, etc.

The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
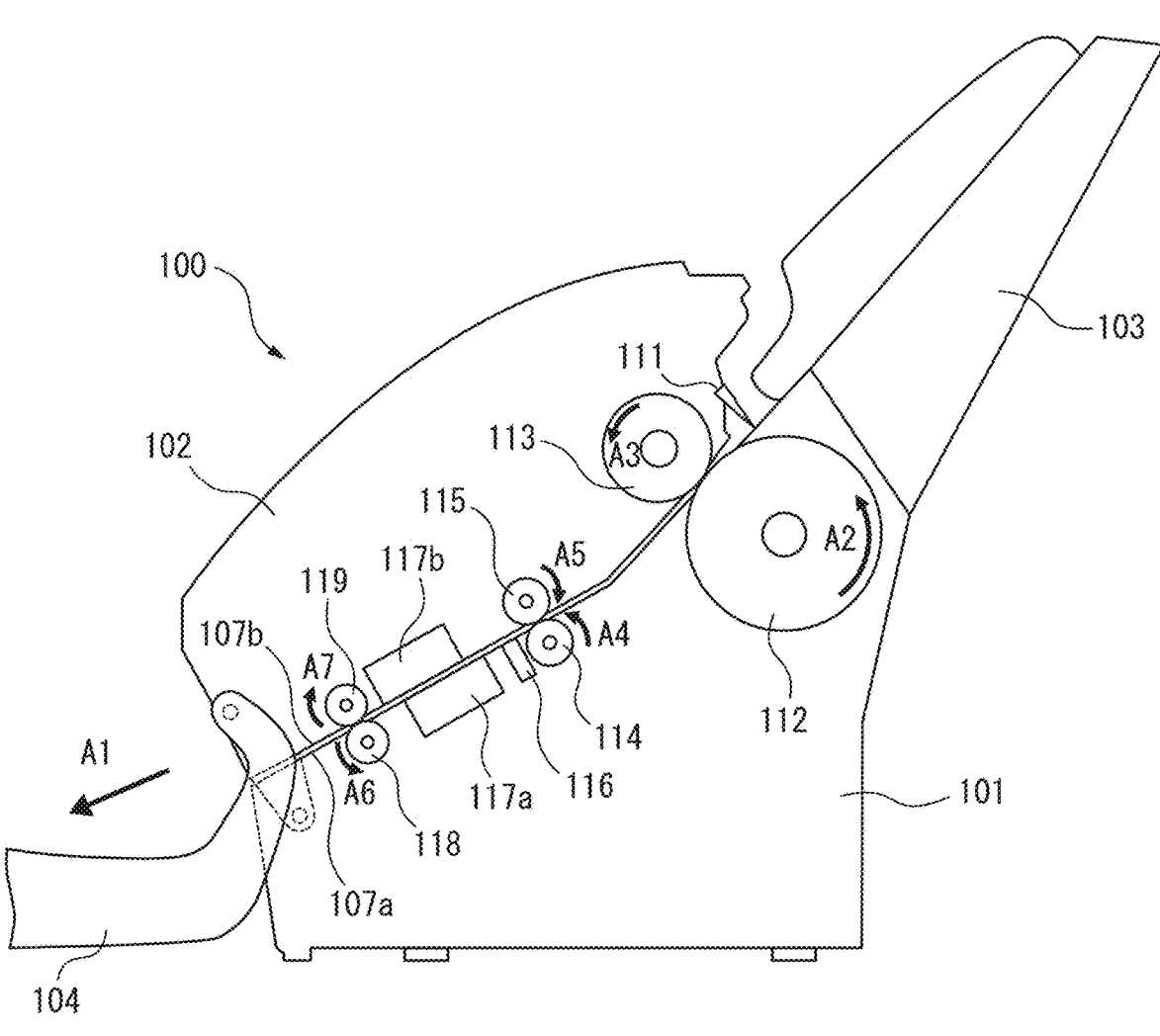
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying device 100 includes a first sensor 111, a feed roller 112, a brake roller 113, a first conveyance roller 114, a second conveyance roller 115, a second sensor 116, a first imaging device 117a, a second imaging device 117b, a third conveyance roller 118 and a fourth conveyance roller 119, etc. The numbers of each roller is not limited to one, and may be plural. The first imaging device 117a and the second imaging device 117b may be collectively referred to as imaging devices 117.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first sensor 111 is located on an upstream side of the feed roller 112 and the brake roller 113. The first sensor 111 includes a contact detection sensor and detects whether or not a medium is placed on the medium tray 103. The first sensor 111 generates and outputs a first medium signal whose signal value changes between a state in which a medium is placed on the medium tray 103 and a state in which a medium is not placed.

The feed roller 112 is provided on the lower housing 101 and sequentially feed media placed on the medium tray 103 from the lower side. The brake roller 113 is provided in the upper housing 102 and is located to face the feed roller 112.

The first conveyance roller 114 is provided on the lower housing 101. The second conveyance roller 115 is provided in the upper housing 102, and is located to face the first conveyance roller 114. The first and second conveyance rollers 114 and 115 are examples of conveyance rollers, are located on the downstream side of the feeding roller 112 and the brake roller 113 in the medium conveying direction A1, and convey the medium fed by the feeding roller 112 and the brake roller 113 to the imaging device 117.

The second sensor 116 is located on the downstream side of the first conveyance roller 114 and the second conveyance roller 115 and on the upstream side of the imaging device 117 in the medium conveying direction A1. The second sensor 116 detects whether or not the medium exists at the position. The second sensor 116 includes a light emitter and a light receiver provided on one side with respect to the conveyance path of the medium, and a reflection member such as a mirror provided at a position facing the light emitter and the light receiver with the conveyance path in between. The light emitter emits light toward the conveyance path. On the other hand, the light receiver receives light projected by the light emitter and reflected by the reflection member, and generates and outputs a second medium signal being an electric signal based on intensity of the received light. Since the light emitted by the light emitter is shielded by the medium when the medium is present at the position of the second sensor 116, the signal value of the second medium signal is changed in a state where the medium is present at the position of the second sensor 116 and a state where the medium is not present. The light emitter and the light receiver may be provided at positions facing one another with the conveyance path in between, and the reflection member may be omitted.

The first imaging device 117*a* is an example of an imaging device, and includes a line sensor based on a unity-magnification optical system type contact image sensor (CIS) including an imaging element based on a complementary metal oxide semiconductor (CMOS) linearly located in a main scanning direction. Further, the first imaging device 117*a* includes a lens for forming an image on the imaging element, and an A/D converter for amplifying and analog-digital (A/D) converting an electric signal output from the imaging element. The first image pickup device 117*a* images a front surface of a conveyed medium, in accordance with control from a processing circuit to be described later.

A second pulse signal including a continuous pulse whose cycle is constant is input to the first imaging device 117*a* from a pulse generator described later. The first imaging device 117*a* acquires an image acquired by imaging the conveyed medium in response to the pulse of the input second pulse signal. In other words, the first imaging device 117*a* acquires a line image of the conveyed medium imaged by the line sensor, for each timing at which a pulse occurs in the second pulse signal (for each rising timing of the pulse). Specifically, a pixel count of a line image in a vertical direction (subscanning direction) is 1, and a pixel count in a horizontal direction (main scanning direction) is larger than 1.

Similarly, the second imaging device 117*b* is an example of an imaging device, and includes a line sensor based on a unity-magnification optical system type CIS including an imaging element based on a CMOS linearly located in a main scanning direction. Further, the second imaging device 117*b* includes a lens for forming an image on the imaging element, and an A/D converter for amplifying and A/D converting an electric signal output from the imaging element. The second imaging device 117*b* generates and outputs an input image acquired by imaging a back surface of the conveyed medium, in accordance with control from a processing circuit to be described later.

The second pulse signal is input to the second imaging device 117*b* from the pulse generator. The second imaging device 117*b* acquires an image acquired by imaging the conveyed medium in response to the pulse of the input second pulse signal. In other words, the second imaging device 117*b* acquires a line image of the conveyed medium imaged by the line sensor, for each timing at which a pulse occurs in the second pulse signal (for each rising timing of the pulse).

The first imaging device 117*a* and the second imaging device 117*b* are examples of an imaging device. Only either of the first imaging device 117*a* and the second imaging device 117*b* may be located in the medium conveying apparatus 100 and only one side of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS.

Further, a line sensor based on a reduction optical system type line sensor including an imaging element based on CMOS or CCDs.

The third conveyance roller 118 is provided on the lower housing 101. The fourth conveyance roller 119 is provided in the upper housing 102, and is located to face the third conveyance roller 118. The third, fourth conveyance rollers 118, 119 are examples of the conveyance rollers, are located on the downstream side of the imaging device 117 in the medium conveying direction A1, and convey the medium conveyed by the first, second conveyance rollers 114, 115 to the ejection tray 104.

A medium placed on the medium tray 103 is conveyed between the lower guide 107*a* and the upper guide 107*b* in the medium conveying direction A1 by the feed roller 112 rotating in a direction of an arrow A2 in FIG. 2. When a medium is conveyed, the brake roller 113 rotate in a direction of an arrow A3. By the workings of the feed roller 112 and the brake roller 113, when a plurality of media are placed on the medium tray 103, only a medium in contact with the feed roller 112, out of the media placed on the medium tray 103, is separated. Consequently, the medium conveying apparatus 100 operates in such a way that conveyance of a medium other than the separated medium is restricted (prevention of multi-feed).

The medium is fed between the first conveyance roller 114 and the second conveyance roller 115 while being guided by the lower guide 107*a* and the upper guide 107*b*. The medium is fed between the first imaging device 114*a* and the second imaging device 114*b* by the first conveyance roller 114 and the second conveyance roller 115 rotating in directions of an arrow A4 and an arrow A5, respectively. The medium read by the imaging device 117 is ejected on the ejection tray 104 by rotating the third conveyance roller 118 and the fourth conveyance roller 119 in the directions of arrows A6 and A7, respectively.

Figure 3:
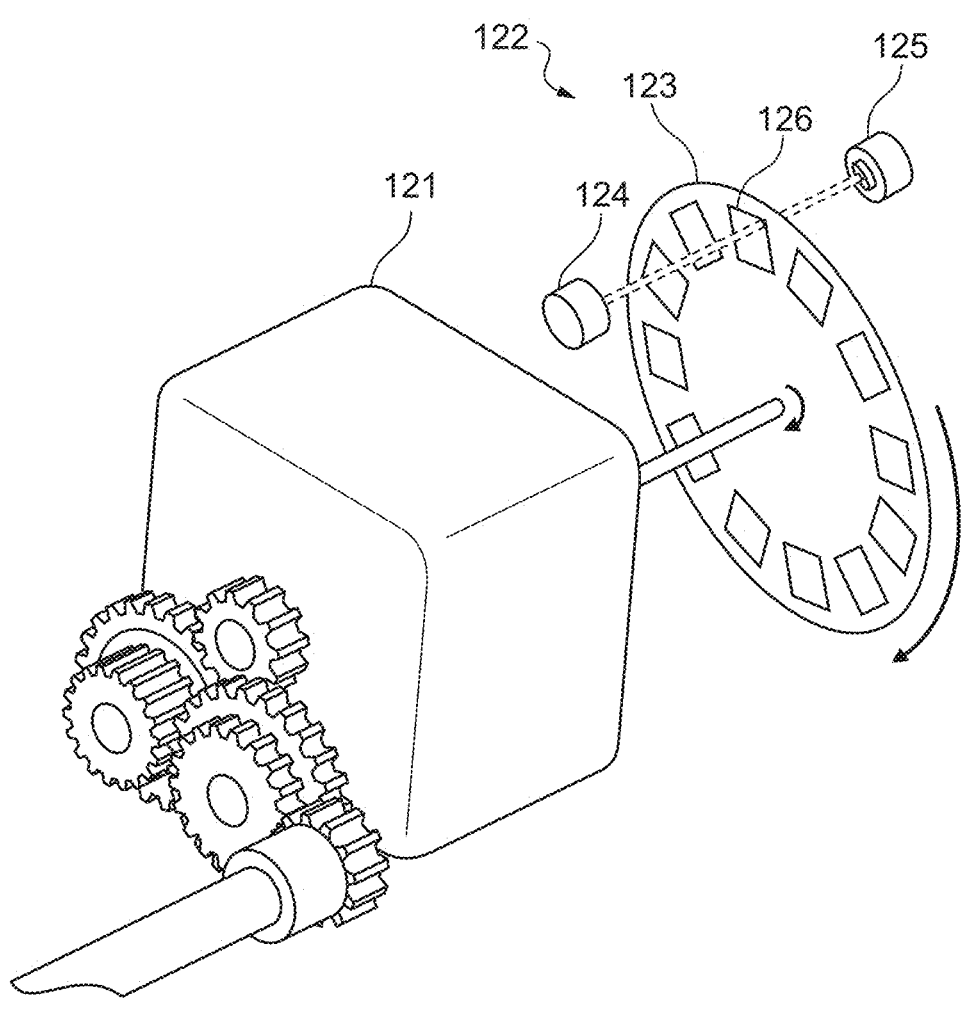
FIG. 3 is a schematic diagram for illustrating a DC motor 121, etc.
Figure 3:
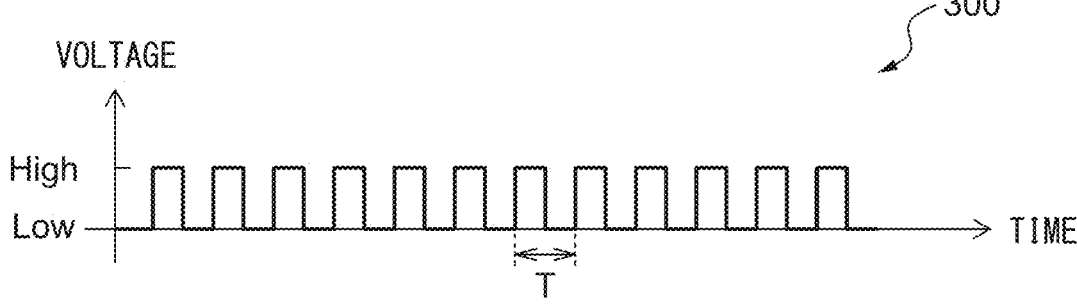

FIG. 3 is a schematic diagram for illustrating a DC motor 121 and an encoder 122.

As shown in FIG. 3, the medium conveying apparatus 100 includes the DC motor 121 and the encoder 122.

The DC motor 121, for example, includes a modulation circuit for PWM (Pulse Width Modulation) modulating a predetermined voltage so as to be a speed specified by the processing circuit to be described later, and rotates according to the voltage acquired by PWM demodulation by the modulation circuit. The DC motor 121 drives and rotates the first to fourth conveyance rollers 114, 115, 118, and 119 to convey the medium by a control signal from the processing circuit. The DC motor 121 may drive only some of the rollers among the first to fourth conveyance rollers 114, 115, 118, and 119. The DC motor 121 may also drive and rotate the feed roller 112 and/or the brake roller 113 to feed the medium.

The encoder 122 includes a disc 123, a light emitter 124 and a light receiver 125. The disc 123 is provided on a rotation axis of the DC motor 121, to rotate in accordance with the rotation of the DC motor 121. A plurality of slits 126 (light transmission hole) is formed on the disc 123. The emitter 124 and the light receiver 125 is provided to face each other across the disc 123. The light emitter 124 irradiates light toward the disc 123. On the other hand, the light receiver 125 generates and outputs a first pulse signal which is an electrical signal corresponding to an intensity of the received light. The signal value of the first pulse signal is a relatively large value (High) while receiving light emitted by the light emitter 124 from the slit 126, and is a relatively small value (Low) while the light emitted by the light emitter 124 is blocked by the disk 123. For convenience, FIG. 3 shows the disc 123 including twelve slits 126, although the actual disc 123 includes hundreds of slits.

The graph 300 of FIG. 3 shows an example of a waveform of the first pulse signal schematically. The horizontal axis of the graph 300 indicates time, the vertical axis indicates voltage of the first pulse signal. The length T of one cycle of the first pulse signal indicates the length of a cycle from when one end of a particular slit 126 in the disc rotation direction passes between the light emitter 124 and the light receiver 125 until one end of the next slit 126 in the disc rotation direction passes between the light emitter 124 and the light receiver 125. In other words, the length T of the cycle of the first pulse signal varies according to a rotation speed of the DC motor 121. Therefore, the medium conveying apparatus 100 can measure the rotation speed of the DC motor 121 using the first pulse signal.

Figure 4:
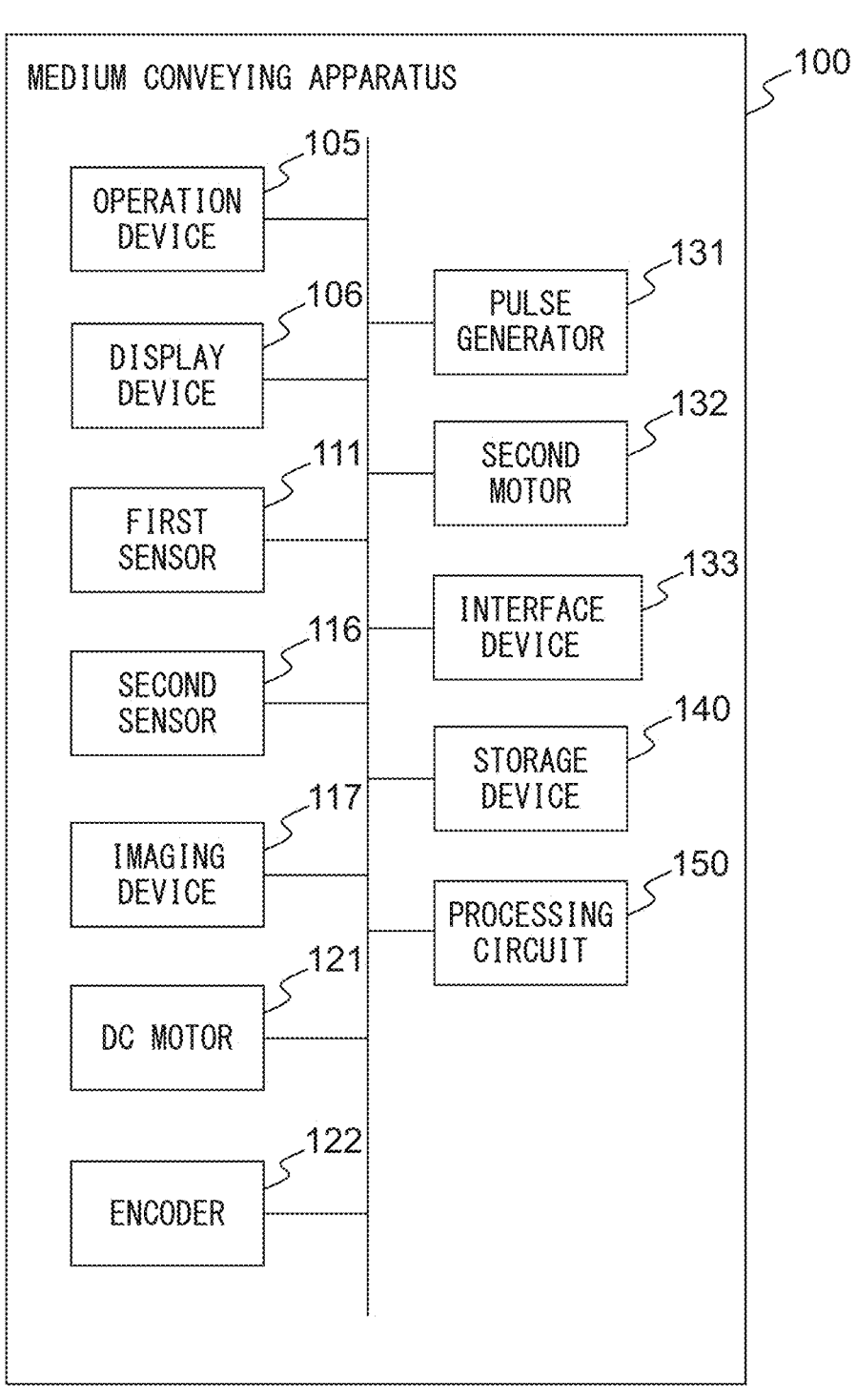
FIG. 4 is a block diagram illustrating a schematic configuration of the medium conveying apparatus 100.

FIG. 4 is a block diagram illustrating a schematic configuration of the medium conveying apparatus 100.

The medium conveying apparatus 100 further includes a pulse generator 131, a second motor 132, an interface device 133, a storage device 140, a processing circuit 150, etc., in addition to the configuration described above.

The pulse generator 131 generates a second pulse signal and outputs it to the imaging device 117 and the processing circuit 150. The length of one cycle of the second pulse signal is set to a length capable of conveying the medium by a distance corresponding to one pixel at a preset resolution when the DC motor 121 is rotated at a reference speed which is the reference rotation speed. Thus, the medium conveying device 100 can generate the input image with a preset resolution by combining the line images acquired by imaging at the timing that each pulse of the second pulse signal occurs when the DC motor 121 rotates at the reference speed.

The second motor 132 drives and rotates the feed roller 112 and the brake roller 113 to feed the medium by a control signal from the processing circuit 150. The second motor 132 is a DC motor. The second motor 132 may be a stepping motor. The feed roller 112 and the brake roller 113 may also be driven by separate motors. The second motor 132 may also drive some of the rollers among the first to fourth conveyance rollers 114, 115, 118, and 119.

For example, the interface device 133 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 133. For example, the predetermined communication protocol is a wireless local area network (LAN).

The storage device 140 includes a memory device such as a random access memory (RAM) or a read only memory (ROM), a fixed disk device such as a hard disk, or a portable storage device such as a flexible disk or an optical disk. Further, the storage device 140 stores a computer program, a database, a table, etc., used for various types of processing in the medium conveying apparatus 100. The computer program may be installed on the storage device 140 from a computer-readable, non-transitory medium such as a compact disc read only memory (CD-ROM), a digital versatile disc read only memory (DVD-ROM), etc., by using a well-known setup program, etc.

The processing circuit 150 operates in accordance with a program previously stored in the storage device 140. The processing circuit 150 is, for example, a CPU (Central Processing Unit). The processing circuit 150 may be a digital signal processor (DSP), a large scale integration (LSI), an application specific integrated circuit (ASIC), a field-programmable gate array (FPGA), etc.

The processing circuit 150 is connected to the operation device 105, the display device 106, the first sensor 111, the second sensor 116, the imaging device 117, the DC motor 121, the encoder 122, the pulse generator 131, the second motor 132, the interface device 133 and the storage device 140, etc., and controls each of these units. The processing circuit 150 drives the DC motor 121 and the second motor 132, to generate an input image by acquiring line images from the imaging device 117, and transmits the input image to the information processing apparatus via the interface device 133. In particular, the processing circuit 150 discards a part of the line images among the line image acquired by the imaging device 117, based on the first pulse signal generated by the encoder 122, generates an input image from the line images that are not discarded.

Figure 5:
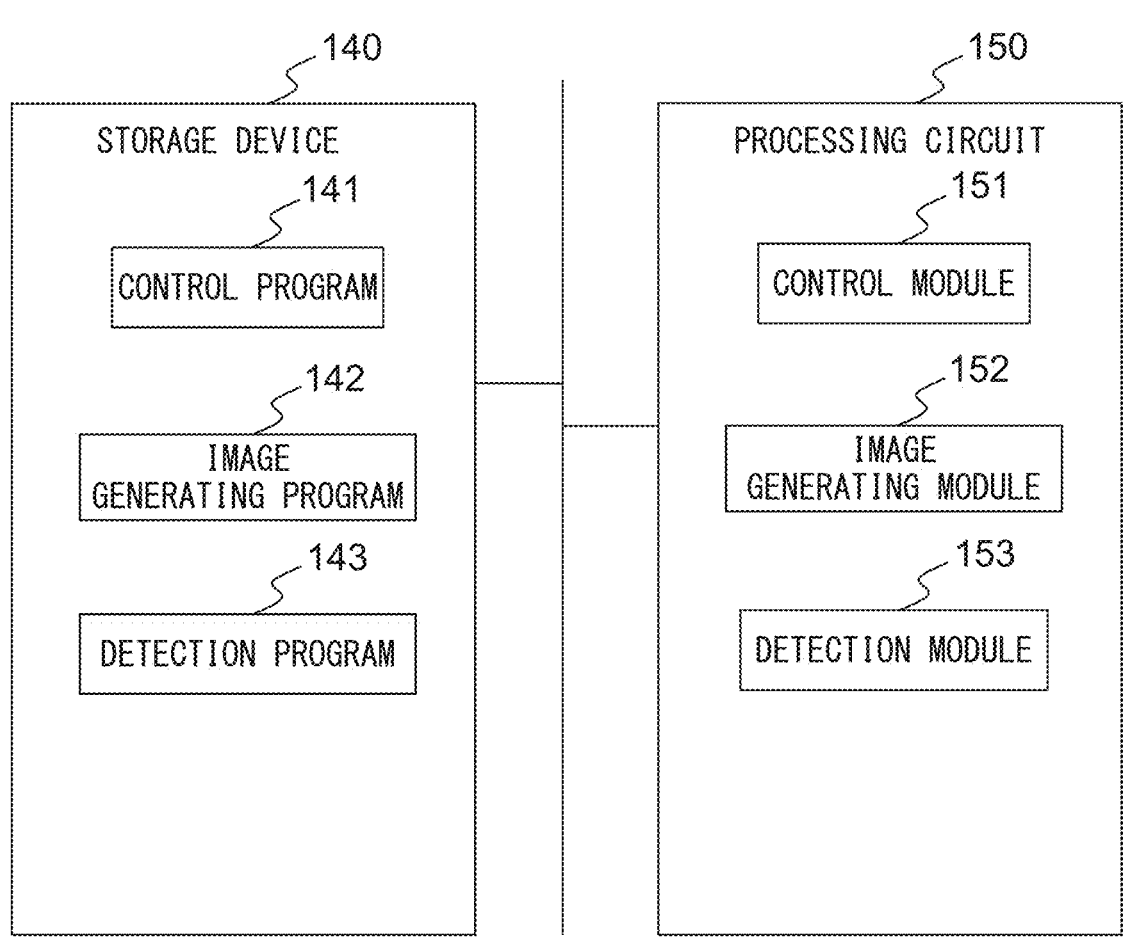
FIG. 5 is a diagram illustrating schematic configurations of the storage device 140 and the processing circuit 150.

FIG. 5 is a diagram illustrating schematic configurations of the storage device 140 and the processing circuit 150.

As shown in FIG. 5, the storage device 140 stores a control program 141, an image generating program 142 and a detection program 143, etc. Each of these programs is a functional module implemented by software operating on a processor. The processing circuit 150 reads each program stored in the storage device 140 and operates in accordance with each read program. Consequently, the processing circuit 150 functions as a control module 151, an image generating module 152 and a detection module 153.

Figure 6:
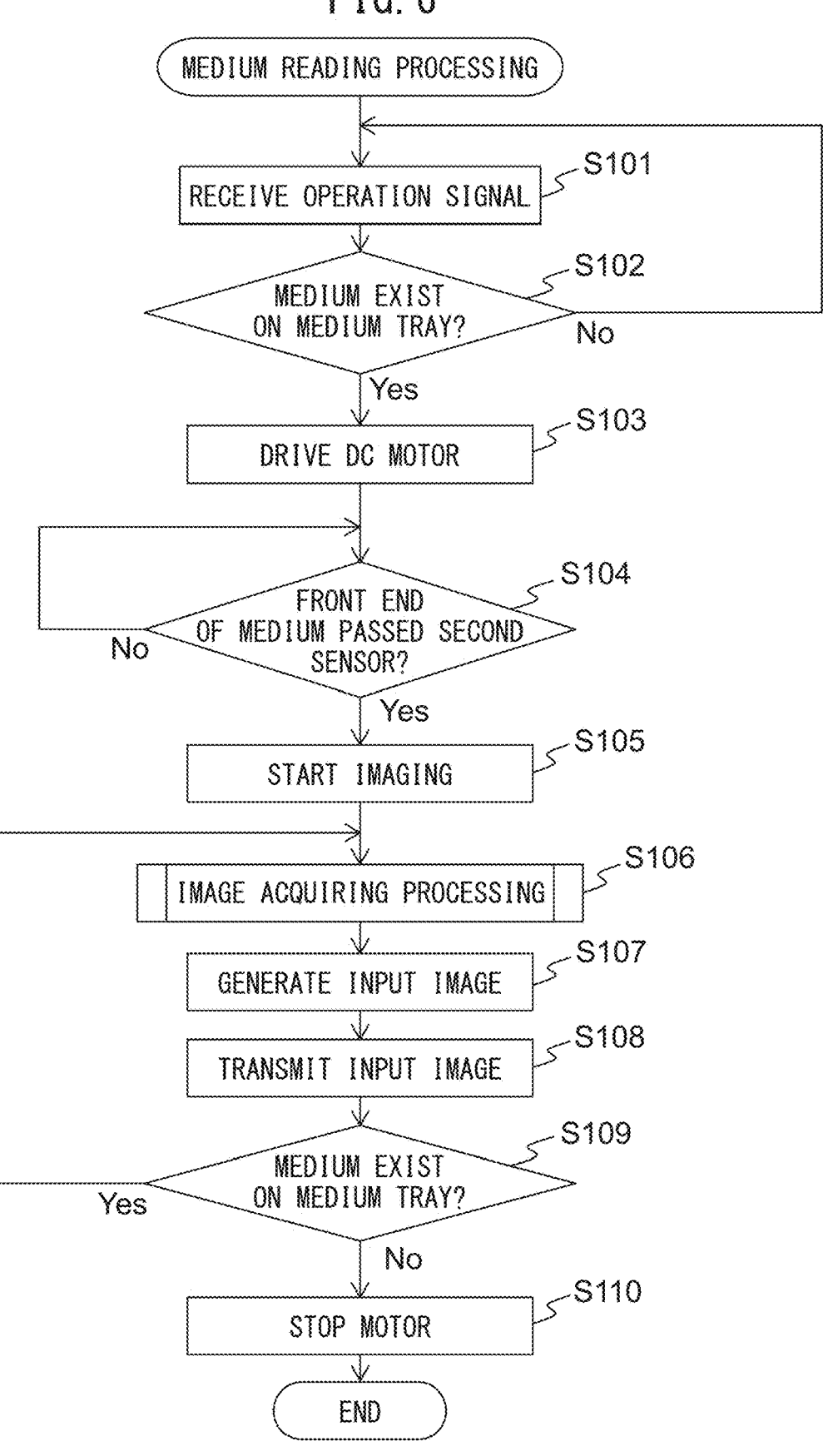
FIG. 6 is a flowchart illustrating an operation example of the medium reading processing.

FIG. 6 is a flowchart illustrating an operation example of medium reading processing in the medium conveying apparatus 100.

Referring to the flowchart illustrated in FIG. 6, an operation example of the medium reading processing in the medium conveying apparatus 100 will be described below. The operation flow described below is executed mainly by the processing circuit 150 in cooperation with each element in the medium conveying apparatus 100, in accordance with a program previously stored in the storage device 140. The operation flow illustrated in FIG. 6 is periodically executed.

First, the control module 151 stands by until an instruction to read a medium is input by a user by use of the operation device 105, and an operation signal instructing to read the medium is received from the operation device 105 (step S101).

Next, the control module 151 acquires the first medium signal from the first sensor 111 and determines whether or not a medium is placed on the medium tray 103 based on the acquired first medium signal (step S102).

When a medium is not placed on the medium tray 103, the control module 151 returns the processing to step S101 and stands by until newly receiving an operation signal from the operation device 105.

On the other hand, when the medium is placed on the medium tray, the control module 151 drives and rotates the second motor 132, rotates the feed roller 112 and the brake roller 113 to feed the medium. Further, the control module 151 drives and rotates the DC motor 121, rotates the first to fourth conveyance rollers 114, 115, 118, and 119 to convey the medium (step S103).

The control module 151 performs a feedback control of the DC motor 121, so that the rotation speed of the DC motor 121 follows the command value such as a preset voltage value. As described above, the disc 123 of the encoder 122 is attached to the rotation shaft of the DC motor 121, the encoder 122 outputs the first pulse signal which varies according to the rotation speed of the DC motor 121. The control module 151 detects the cycle of the first pulse signal output from the encoder 122 every predetermined feedback control cycle, for example, every 500 ns, and controls the DC motor 121 so that the voltage value acquired by converting a frequency into a voltage coincides with the command value. Although, the DC motor 121 can easily perform the speed adjustment at a low cost, the rotation speed of the DC motor 121 varies by an external factor such as a load variation. However, the rotation speed of the DC motor 121 changes a rotation speed corresponding to the command value after a predetermined cycle, by the above feedback control. Thus, the control module 151 controls the rotation speed of the DC motor 121 so that the cycle of the first pulse signal output from the encoder 122 follows the command value.

Next, the image generating module 152 determines whether or not the front end of the medium has passed the position of the second sensor 116 and waits until the front end of the medium passes the position of the second sensor 116 (step S104). The image generating module 152 periodically acquires the second medium signal from the second sensor 116 and determines whether or not the medium is present at a position of the second sensor 116 based on the acquired second medium signal. When a signal value of the second medium signal changes from a value indicating nonexistence of a medium to a value indicating existence of a medium, the image generating module 152 determines that the front end of the medium has passed through the position of the second sensor 116.

When the front end of the medium passes through the position of the second sensor 116, the image generating module 152 causes the imaging device 117 to start imaging (step S105).

Next, the processing circuit 150 executes the image acquiring processing (step S106). In the image acquiring processing, the detection module 153 detects the number of pulses of the second pulse signal included in each cycle of the first pulse signal. The image generating module 152 acquires line images from the imaging device 117, and discards the line images based on the number of pulses detected by the detection module 153. Details of the image acquisition processing will be described later.

Next, the image generating module 152 combines the line images that are not discarded among the line images acquired in the image acquiring process to generate an input image (S107 of steps).

Next, the image generating module 152 transmits the generated input image to the information processing device via the interface device 133 (step S108). When not being connected to the information processing device, the image generating module 152 stores the input image in the storage device 140.

Next, the control module 151 determines whether or not the medium remains on the medium tray 103 based on the first medium signal acquired from the first sensor 111 (step S109). When a medium remains on the medium tray 103, the control module 151 returns the processing to step S106 and repeats the processing in steps S106 to S109.

On the other hand, when a medium does not remain on the medium tray 103, the control module 151 stops the DC motor 121 and the second motor 132 (step S110), and ends the series of steps.

Figure 7:
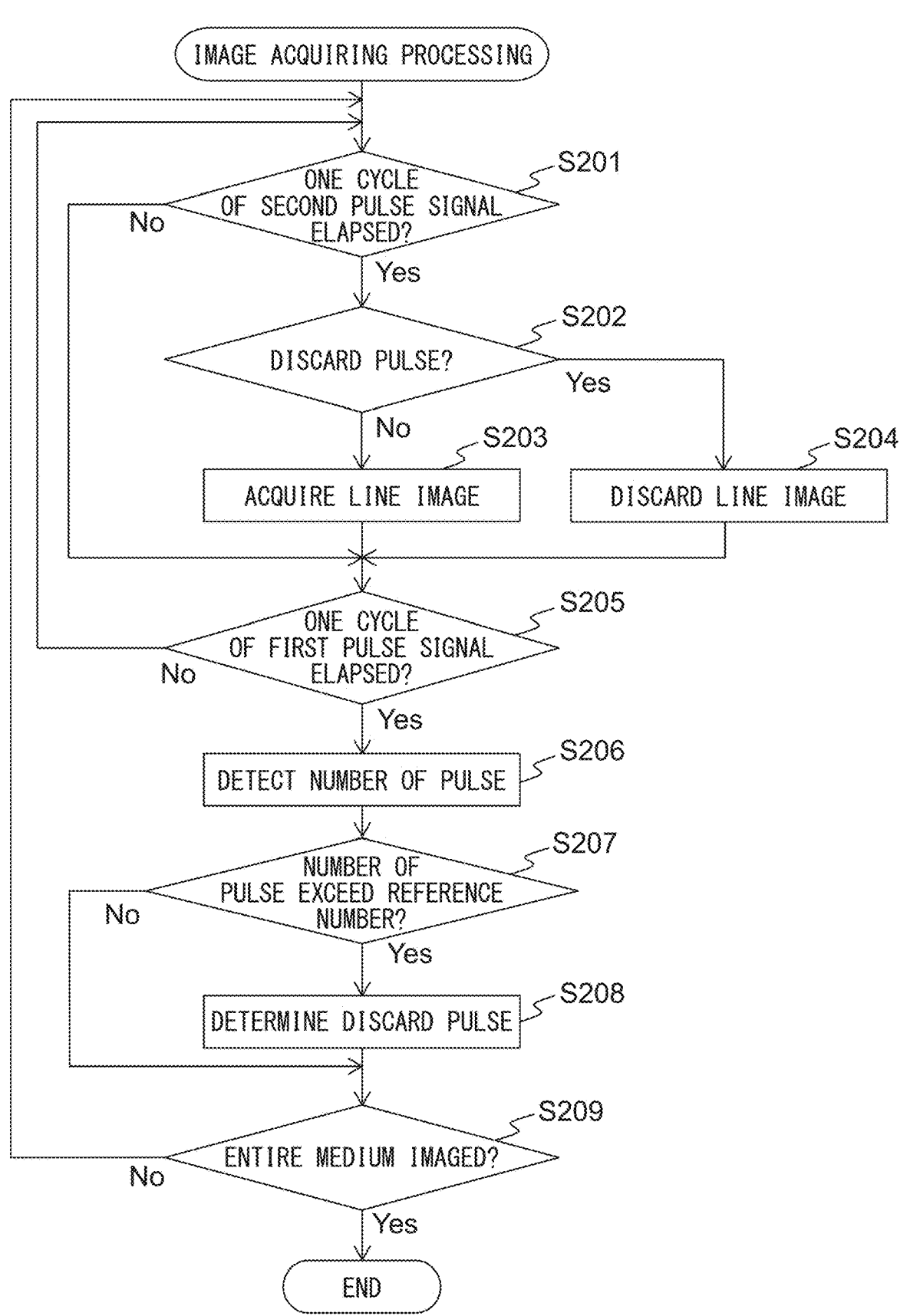
FIG. 7 is a flowchart illustrating an operation example of the image acquisition processing.

FIG. 7 is a flowchart illustrating an operation example of the image acquisition process.

The flow of operation shown in FIG. 7 is performed in the step S106 of the flow chart shown in FIG. 6.

First, the image generating module 152 determines whether or not one cycle of the second pulse signal has elapsed (step S201). The image generating module 152 periodically receives the second pulse signal from the pulse generator 131, determines that one cycle of the second pulse signal has elapsed when a next pulse occurs (rises) after a specific pulse occurs (rises), in the received second pulse signal. When one cycle of the second pulsed signal has not elapsed, the image generating module 152 proceeds the processing to step S205.

On the other hand, when one cycle of the second pulse signal has elapsed, the image generating module 152 determines whether or not the pulse included in the elapsed cycle is a discard pulse (step S202). The discard pulse is a pulse for discarding the line image acquired by the imaging device 117, among the pulses included in the second pulse signal, and is determined in the processing of step S208 to be described later. The discard pulse in current cycle of the first pulse signal is determined when the immediately preceding cycle has elapsed. When the current cycle of the first pulse signal is the first cycle, the image generating module 152 determines that the pulse included in the current cycle is not the discard pulse. Further, the image generating module 152 determines that the pulse included in the current cycle is not the discard pulse when the discard pulse is not determined since the number of pulses detected by the detection module 153 is equal to or less than the reference number, in the immediately preceding cycle.

When the pulse included in the current cycle is not the discard pulse, the image generating module 152 acquires a line image acquired by the imaging device 117 in the pulse from the imaging device 117, and stores it in the storage device 140 (step S203).

On the other hand, when the pulse included in this cycle is the discard pulse, the image generating module 152 discards the line image acquired by the imaging device 117 in the pulse (step S204). The image generating module 152 once acquires the line image from the imaging device 117, and discards the acquired line image without storing in the storage device 140. The image generating module 152 may discard the line image without acquiring the line image from the imaging device 117.

Next, the detection module 153 determines whether or not one cycle of the first pulse signal has elapsed (step S205). The detection module 153 receives the first pulse signal periodically from the encoder 122, and determines that one cycle of the first pulse signal has elapsed when a next pulse occurs (rises) after a specific pulse occurs (rises) in the first pulse signal received. When one cycle of the first pulse signal has not elapsed, the detection module 153 returns the processing to step S201.

On the other hand, when one cycle of the first pulse signal has elapsed, the detection module 153 detects a number of pulses of the second pulse signal included in the elapsed cycle of the first pulse signal (step S206). The detection module 153 detects, as the number of pulses of the second pulse signal included in the cycle of the first pulse signal, the number of pulses occurred in the second pulse signal from when a pulse included in the elapsed cycle occurs to when a next pulse occurs in the first pulse signal.

Next, the image generating module 152 determines whether or not the number of pulses detected by the detection module 153 exceeds a reference number (S207 of steps). The reference number is preset to the number of pulses of the second pulse signal included in one cycle of the first pulse signal when a medium is not conveyed. When the number of pulses detected by the detection module 153 is equal to or less than the reference number, the image generating module 152 proceeds the processing to step S209.

On the other hand, when the number of pulses detected by the detection module 153 exceeds the reference number, the image generating module 152 determines discard pulses for discarding the line images acquired by the imaging device 117, among the pulses of the second pulse signal included in the next cycle of the first pulse signal (step S208). The image generating module 152 determines the same number of pulses as difference between the number of pulses detected by the detection module 153 and the reference number, i.e. a number acquired by submitting the reference number from the number of pulses detected by the detection module 153, among the pulses of the second pulse signal included in the next cycle of the first pulse signal, to the discard pulses. In other words, the image generating module 152 determines the same number of pulses as a number exceeding the reference number, among the pulses of the second pulse signal included in the next cycle of the first pulse signal, to the discard pulse. Further, the image generating module 152 determines the discard pulse so as to discard the image intermittently in the next cycle.

Thus, when the number of pulses of the second pulse signal included in a predetermined cycle of the first pulse signal exceeds the reference number, the image generating module 152 discards the images acquired by the imaging device 117 in the same number of pulses as difference between the detected number of the pulses and the reference number, in the next cycle of the predetermined cycle of the first pulse signal. In other words, when the number of pulses of the second pulse signal included in a predetermined cycle of the first pulse signal exceeds the reference number, the image generating module 152 acquires only images acquired by the imaging device 117 in the reference number of pulses, among the images acquired by the imaging device 117 in the next cycle of the predetermined cycle of the first pulse signal.

Figure 8:
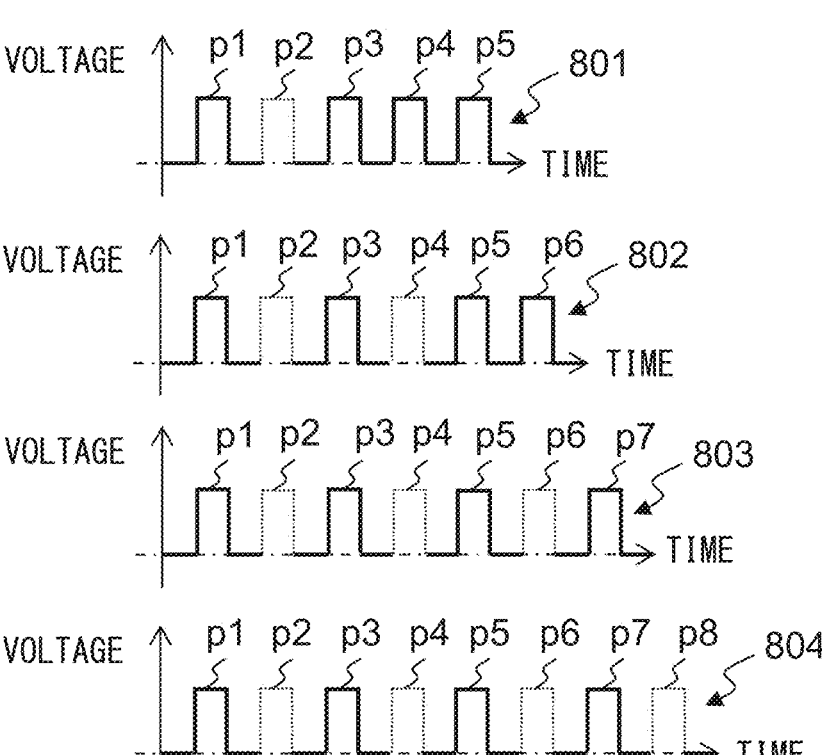
FIG. 8 is a graph showing a second pulse signal included in a predetermined cycle.
Figure 8:
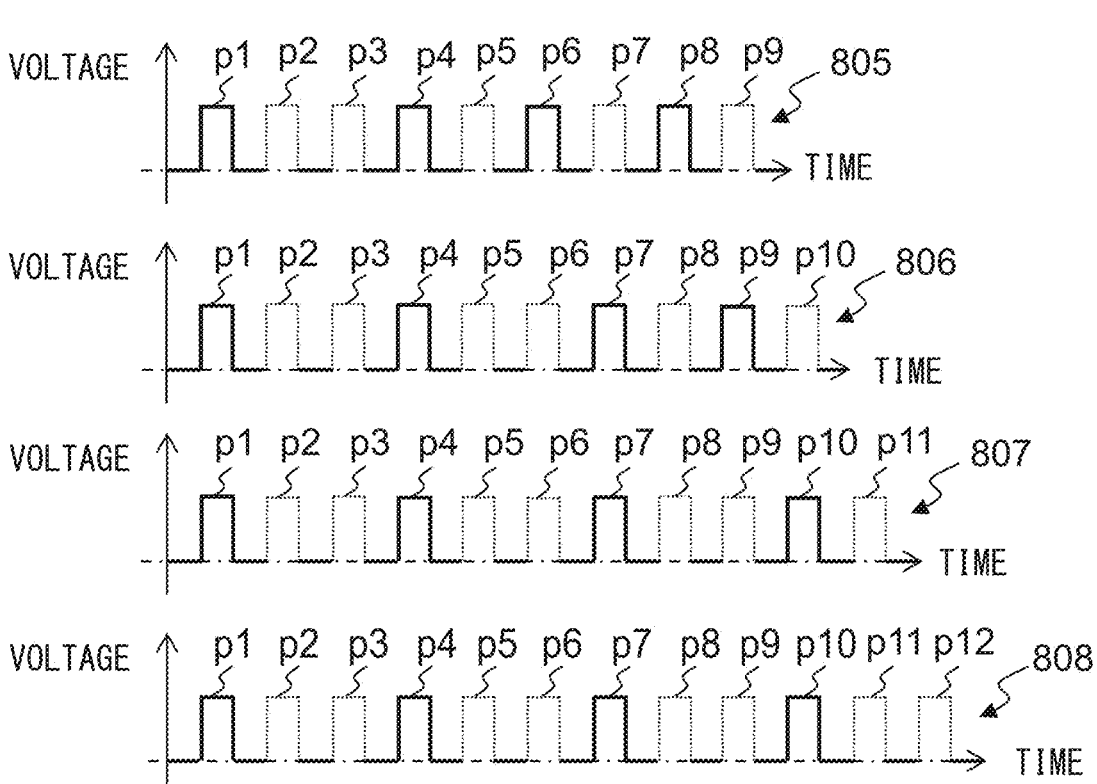

FIG. 8 is a graph showing a second pulse signal 801 to 808 included in a predetermined cycle of the first pulse signal. The horizontal axis of each graph indicates time, the vertical axis indicates magnitude of voltage of the second pulse signal. In the example shown in FIG. 8, the number of pulses of the second pulse signals 801 to 808 included in the predetermined cycle of the first pulse signal is 5 to 12, respectively. The reference number in the first pulse signal is assumed to be 4.

The image generating module 152 determines, for each of the second pulse signals 801 to 808, the number of the discard pulses of the second pulse signal included in the next cycle of the first pulse signal to 1 to 8, respectively. Thus, the number of line images acquired by the image generating module 152 in the next cycle of the first pulse signal is expected to be four.

The image generating module 152 determines the pulse corresponding to the second pulse p2 among the pulses p1 to p5 of the second pulse signal 801 as the discard pulse of the next cycle. The image generating module 152 determines the pulses corresponding to the second and fourth pulses p2 and p4 among the pulses p1 to p6 of the second pulse signal 802 as the discard pulses of the next cycle. The image generating module 152 determines the pulses corresponding to the second, fourth, and sixth pulses p2, p4, and p6 among the pulses p1 to p7 of the second pulse signal 803 as the discard pulses of the next cycle. Further, the image generating module 152 determines the pulses corresponding to the second, fourth, sixth, and eighth pulses p2, p4, p6, and p8 among the pulses p1 to p8 of the second pulse signal 804 as the discard pulses of the next cycle.

Thus, when the number of pulses of the second pulse signal included in the cycle of the first pulse signal is equal to or less than twice the reference number, the image generating module 152 determine the discard pulse so that the discard pulse is not continuous. Thus, the image generating module 152 can discard the line image so that the characters, etc., included in the medium in the input image do not disappear.

The image generating module 152 determines the pulses corresponding to the second, third, fifth, seventh, and ninth pulses p2, p3, p5, p7, and p9 among the pulses p1 to p9 of the second pulse signal 805 as the discard pulses of the next cycle. The image generating module 152 determines the pulses corresponding to the second, third, fifth, sixth, eighth, and tenth pulses p2, p3, p5, p6, p8, and p10 among the pulses p1 to p10 of the second pulse signal 806 as the discard pulses of the next cycle. The image generating module 152 determines the pulses corresponding to the second, third, fifth, sixth, eight, ninth, and eleventh pulses p2, p3, p5, p6, p8, p9, and p11 among the pulses p1 to p11 of the second pulse signal 807 as the discard pulses of the next cycle. The image generating module 152 determines the pulses corresponding to the second, third, fifth, sixth, eighth, ninth, eleventh, and twelfth pulses p2, p3, p5, p6, p8, p9, p11, and p12 among the pulses p1 to p12 of the second pulse signal 808 as the discard pulses of the next cycle.

Thus, when the number of pulses of the second pulse signal included in the cycle of the first pulse signal is greater than twice the reference number, the image generating module 152 determines the discard pulses so that the pulses not discarded are not continuous and are scattered (are dispersed at substantially equal intervals). Thus, the image generating module 152 can discard the line images so that a straight line extending in the oblique direction in the input image does not become zigzag.

Next, the image generating module 152 determines whether or not the entire conveyed medium has been imaged (S209 of steps). The image generating module 152, for example, acquires the second medium signal periodically from the second sensor 116 and determines whether or not the medium exists at the position of the second sensor 116 based on the acquired second medium signal. The image generating module 152 determines that the rear end of the medium has passed through the position of the second sensor 116 when the signal value of the second medium signal changes from the value indicating existence of a medium to the value indicating nonexistence of a medium. The image generating module 152 determines that the entire medium has been imaged when a predetermined time has elapsed after the rear end of the medium has passed through the position of the second sensor 116.

When the entire conveyed medium has not been imaged, the image generating module 152 returns the processing to step S201 and repeats the processing of step S201 to S209.

On the other hand, when the entire conveyed medium has been imaged, the image generating module 152 ends the series of steps.

After the image acquisition processing, in step S107, the image generating module 152 generates the input image using the line images acquired in step S203 and stored in the storage device 140, that is, the line images that are not discarded in step S204. In other words, when the number of pulses of the second pulse signal included in each cycle of the first pulse signal exceeds the reference number, the image generating module 152 generates the input image using images acquired by the imaging device 117 in the reference number of pulses, among the images acquired by the imaging device 117 in the next cycle of the first pulse signal.

Hereinafter, the technical significance of discarding the line images acquired by the imaging device 117 in accordance with the number of pulses detected by the detection module 153, will be described.

Figure 9A:
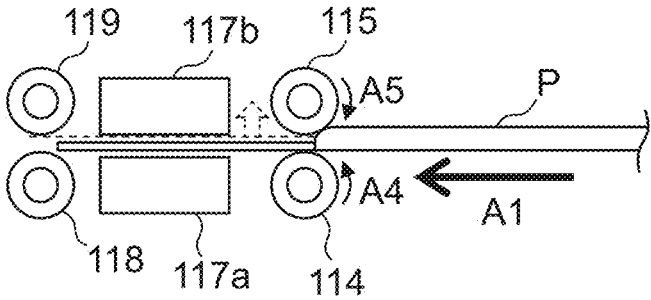
FIG. 9A is a schematic diagram for illustrating that a cycle of a first pulse signal varies.
Figure 9B:
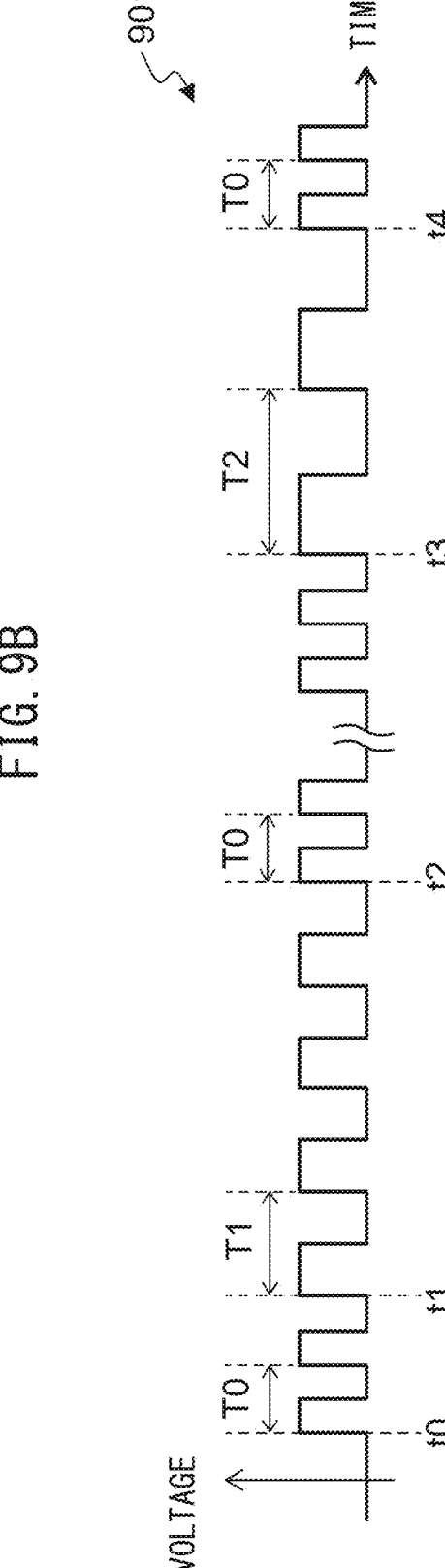
FIG. 9B is a schematic diagram for illustrating that a cycle of a first pulse signal varies.

FIG. 9A and FIG. 9B are schematic diagrams for illustrating that the cycle of the first pulse signal output from the encoder 122 varies due to a load variation when the medium passes through the respective conveyance rollers.

In the exemplary embodiment shown in FIG. 9A, the conveyed medium P is a booklet such as a passport read in a state where pages including a photograph is opened, and has a plurality of regions having different thicknesses. The medium P has a first region having a relatively thin thickness (left side in the drawing) and a second region having a relatively thick thickness (right side in the drawing) across a stitched portion. FIG. 9A shows a state in which, after the first region of the medium P passes between the first conveyance roller 114 and the second conveyance roller 115, the second region of the medium P is about to be fed between the first conveyance roller 114 and the second conveyance roller 115. In the state shown in FIG. 9A, the imaging device 117 reads the first area of the medium P.

When the front end portion, the stitched portion or the rear end portion of the medium P pass between the first conveyance roller 114 and the second conveyance roller 115, the rotation speed of the DC motor 121 varies due to the load change when the first conveyance roller 114 and the second conveyance roller 115 bite the respective portions of the medium P. Also, when the front end portion, the stitched portion or the rear end portion of the medium P pass between the third conveyance roller 118 and the fourth conveyance roller 119, the rotation speed of the DC motor 121 varies due to the load change when the third conveyance roller 118 and the fourth conveyance roller 119 bite the respective portions of the medium P.

FIG. 9B is a graph showing an example of first pulsed signal 901 output from the encoder 122. The horizontal axis of the graph of FIG. 9B indicates time, the vertical axis indicates magnitude of voltage of the first pulsed signal. Since the pulse of the first pulse signal 901 occurs according to the rotation of the DC motor 121, the cycle of the first pulse signal 901 varies according to the rotation speed of the DC motor 121.

At time t0, the medium P is not yet fed between the first conveyance roller 114 and the second conveyance roller 115, the rotation speed of the DC motor 121 is kept at a constant reference speed by feedback control by the control module 151. Therefore, the cycle of the first pulse signal 901 maintains a constant reference length T0.

At time t1, the front end portion of the medium P is bitten by the first conveyance roller 114 and the second conveyance roller 115, the rotation speed of the DC motor 121 is slowed due to the load change, the cycle of the first pulse signal 901 changes to the length T1 which is longer than the reference length T0. Since feedback control does not work immediately even when the cycle of the first pulse signal 901 at time t1 changes long, the rotation speed of the DC motor 121 does not return to the original for a while, the cycle remains a length T1 for a while.

At time t2, the cycle of the first pulse signal 901 returns to the reference length T0 again, by the feedback control by the control module 151.

Since the second conveyance roller 115, the second imaging device 117b and the fourth conveyance roller 119 located on the upper side of the conveyance path, are movably provided upward, they moves upward in accordance with the thickness of the medium P in conveyance. The medium P fed between the reading surface of the first imaging device 117a and the reading surface of the second imaging device 117b by the first conveyance roller 114 and the second conveyance roller 115 is read by each of the imaging device 117. Also, when the front end portion of the medium P passes through the third conveyance roller 118 and the fourth conveyance roller 119 while the imaging device 117 is reading the medium P, the cycle of the first pulse signal 901 varies in the same manner as the variation at time t1 to t2 due to the load change.

At time t3, the stitched portion of the medium P is bitten by the first conveyance roller 114 and the second conveyance roller 115, the rotation speed of the DC motor 121 is slowed due to the load change, and the cycle of the first pulse signal 901 changes to the length T2 which is longer than the reference length T0. Since the thickness of the second region is greater than the thickness of the first region, the load variation when the second region is bitten by the first conveyance roller 114 and the second conveyance roller 115, is larger than the load variation when the first region is bitten by the first conveyance roller 114 and the second conveyance roller 115. As a result, the length T2 of the cycle of the first pulse signal 901 at time t3 is longer than the length T1 of the cycle of the first pulse signal 901 at time t1.

At time t4, the cycle of the first pulse signal 901 returns to the reference length T0 again by the feedback control by the control module 151.

Also, when the stitched portion of the medium P passes through the third conveyance roller 118 and the fourth conveyance roller 119, the cycle of the first pulse signal 901 varies in the same manner as the variation at time t3 to t4 due to the load change. Also, when the rear end portion of the medium P passes through the first conveyance roller 114, the second conveyance roller 115, the third conveyance roller 118 and the fourth conveyance roller 119, the cycle of the first pulse signal 901 varies in the same manner as the variation at time t1 to t2 due to the load change.

Figure 10:
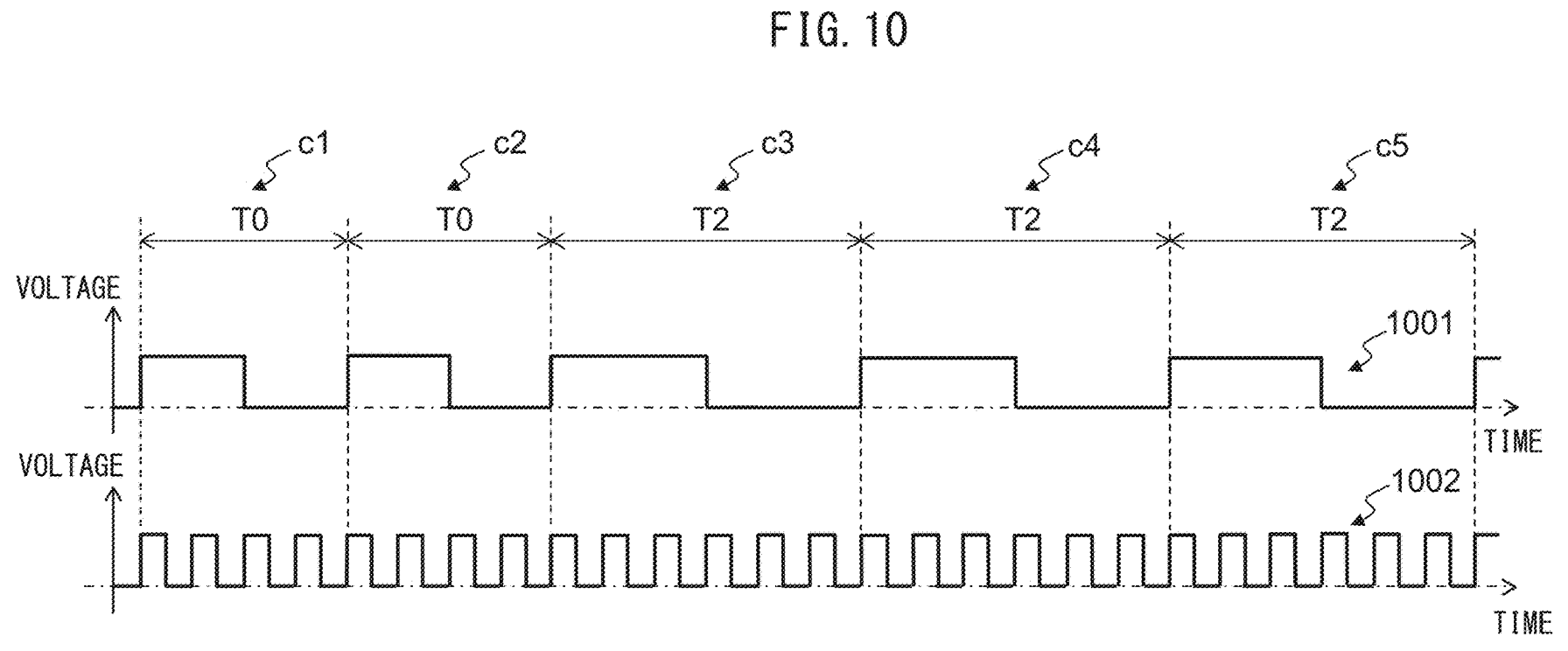

FIG. 10 is a graph showing a relationship between the first pulse signal and the second pulse signal. The horizontal axis of each graph indicates time, and the vertical axis indicates magnitude of voltage of each signal. The upper graph of FIG. 10 shows an example of a first pulse signal 1001, and the lower graph shows an example of a second pulse signal 1002. The reference number in the first pulse signal is assumed to be 4.

As described above, the rotation speed of the DC motor 121 varies due to the load change when the medium passes through the conveyance roller, the cycle of the first pulse signal varies. In the example shown in FIG. 10, in period c1 and period c2, the rotation speed of the DC motor 121 is kept at a constant reference speed by feedback control by the control module 151. On the other hand, in period c3, period c4 and period c5, the rotation speed of the DC motor 121 is slower than the reference speed due to the load change. Therefore, in the first pulse signal 1001 shown in FIG. 10, the cycle in period c1 and period c2 maintains a constant reference length T0, the cycle in period c3, period c4 and period c5 changes to a length T2 longer than the reference length T0.

On the other hand, the cycle of the second pulse signal is constant. In the example shown in FIG. 10, period c1 and period c2, the number of pulses of the second pulse signal 1002 included in one cycle of the first pulse signal 1001 is four which is the reference number. On the other hand, period c3, period c4 and period c5, the number of pulses of the second pulse signal 1002 included in one cycle of the first pulse signal 1001 is six more than the reference number. Since the pulses of the first pulse signal 1001 occurs according to the rotation of the DC motor 121, the conveyance distance of the medium is constant in each period c1 to period c5 which is one cycle of the first pulse signal 1001. Therefore, an input image generated by combining the line images imaged in all pulses of the second pulse signal 1002 included in period c3, period c4 and period c5, extends.

The image generating module 152 can generate an image that is not extended, by discarding the line images acquired by the imaging device 117 in two pulses, among the pulses of the second pulse signal 1002 included in period c3, period c4 and period c5.

When the image generating module 152 extracts images to be discarded after gathering together all the line images acquired by the imaging device 117 in period c3, period c4 and period c5, the processing time required for extraction is increased, and the processing load of the image acquisition processing is increased. Therefore, in period c3 in which the load change occurs, the image generating module 152 determines a discard pulses for discarding the line images in the cycle of next period c4, without discarding the line image. The image generating module 152 discards the line images the acquired by the imaging device 117 in the determined discard pulse, at the timing of acquiring each line image acquired by the imaging device 117, in the cycle of next period c4. Similarly, the image generating module 152 determines the discard pulses for discarding the line images in the cycle of next period c5, in period c4, and discards the line images acquired by the imaging device 117 in the determined discard pulse, in the cycle of next period c5.

Although the extension occurs in the region corresponding to the cycle in which the load variation occurs in the input image, the region corresponding to one cycle in the input image is sufficiently small, the occurrence of the extension is not conspicuous. The image generating module 152 can generate an input image in which the extension is not conspicuous while reducing the processing load of the image acquisition process by preventing the occurrence of the extension in the region corresponding to the cycle after the cycle in which the load change occurs.

Further, as described above, since feedback control does not work immediately after the load fluctuation occurs, the varied cycle keeps the changed length for a while. Therefore, the length of the next cycle of the cycle in which the load fluctuation occurs is likely to be the same as the length of the cycle in which the load fluctuation occurs. The image generating module 152 accurately generate an input image that is not extended, while reducing the processing load of the image acquisition processing, by determining the number of line images to be discarded in the next cycle in accordance with the number of pulses of the second pulse signal included in the cycle in which the load change occurs.

Figure 11:
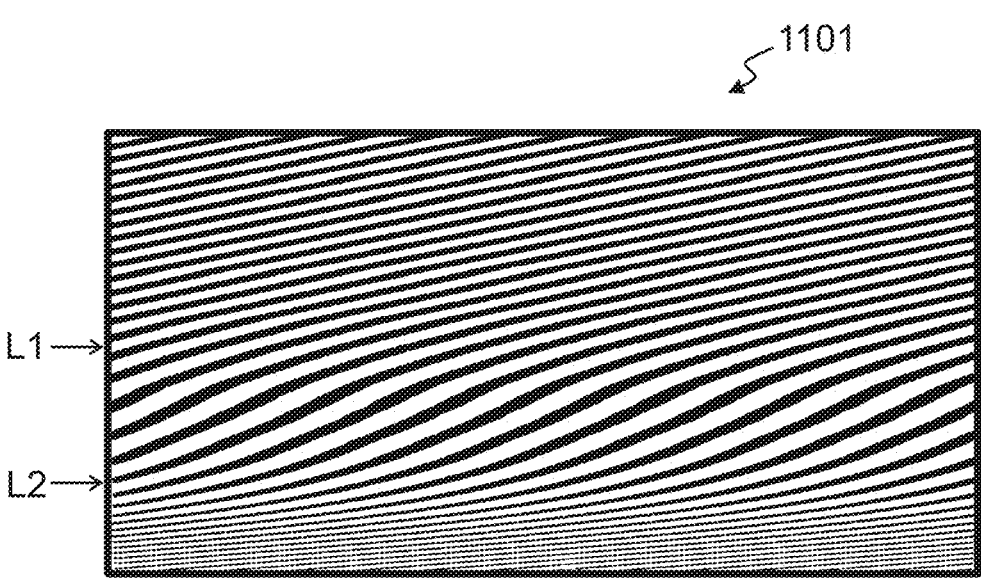
FIG. 11 is a schematic diagram illustrating an example of an input image.
Figure 11:

FIG. 11 is a schematic diagram illustrating an example of an input image generated by the image generating module 152.

The input image 1101 is an example of an input image generated without discarding the line images when the load change occurs. In the input image 1101, the load variation occurs and the rotation speed of the DC motor 121 is slowed when the line L1 is imaged, and the rotation speed of the DC motor 121 returns to the reference speed under feedback control when the line L2 is imaged. Therefore, the extension in a region from the line L1 to the line L2 in the input image 1101 occurs.

The input image 1102 is an example of an input image in which line images are discarded when a load change occurs. In the input image 1102, the load variation occurs and the rotation speed of the DC motor 121 is slowed when the line L3 is imaged, and the rotation speed of the DC motor 121 returns to the reference speed under feedback control when the line L4 is imaged. However, in the input image 1102, a part of the line images among the line images corresponding to a region from the line L3 to the line L4 is discarded. Therefore, the occurrence of the extension in the region from the line L3 to the line L4 in the input image 1102 is suppressed.

As described in detail above, when the number of pulses of the second pulse signal for defining the image acquisition timing exceeds the reference number, included in each cycle of the first pulse signal which varies according to the rotation speed of the DC motor 121, the medium conveying device 100 reduces the number of image acquisition in the next cycle. Therefore, the medium conveying device 100 can more easily generate an appropriate image while conveying the medium using the DC motor 121.

The medium conveying apparatus 100 can convey a plurality of types of media having various thicknesses, including media having a plurality of regions having different thicknesses, such as a passport in an open state, using the DC motor 121 which is low cost, and suitably image the media. Therefore, the medium conveying apparatus 100 can generate an appropriate input image while reducing the equipment cost.

Further, the medium conveying device 100 uses, as the second pulse signal input to the imaging device 117, a signal whose cycle is constant, rather than a signal synchronized with the first pulse signal output from the encoder 122. Therefore, the medium conveying apparatus 100 can generate the second pulse signal using the pulse generator 131 which is low cost, and generate an appropriate input image while reducing the equipment cost.

Further, since the medium conveying device 100 generates an input image while discarding the line images acquired by the imaging device 117 in the medium reading processing, the medium conveying device 100 can generate an appropriate input image in real time. Thus, the information processing apparatus connected to the medium conveying apparatus 100 does not need to correct the input image, the user can acquire an appropriate input image earlier, the medium conveying apparatus 100 can improve the convenience of the user. Further, since the information processing device connected to the medium conveying apparatus 100 does not need to correct the input image, the information processing device can smoothly perform the display processing of the image, thereby can improve the business efficiency of the user.

The image generating module 152 may discard the line image acquired by the image pickup device 117 in the number of pulses of the difference between the number of pulses detected by the detection module 153 and the reference number, only when the number of detected pulses is an integer multiple of the reference number. In that case, when the detected number of pulses exceeds the reference number and the detected number of pulses is not an integer multiple of the reference number, the image generating module 152 may combine all the line images acquired by the imaging device 117 in the cycle, thereafter, correct the image by a linear interpolation method. The image generating module 152 generates a corrected image having a reference number of lines from the combined image acquired by combining all the line images. The image generating module 152 extracts, for each line in the corrected image, an image of the nearest neighbor line at the upper side and an image of the nearest neighbor line at the lower side of the position corresponding to each line from the combined image, and generates an image of each line from the extracted two images by a linear interpolation method. Thus, the image generating module 152 can generate an input image in which the extension is more accurately modified.

The image generating module 152 may transmit information indicating an area in which the line image is discarded in the input image to the information processing apparatus via the interface device 133, together with the generated input image. Thus, when a predetermined image processing is performed on the input image, the information processing device can perform image processing with emphasis on an area in which the line image is discarded in the input image or except for an area in which the line image is discarded in the input image.

Further, when the difference between the number of pulses detected by the detection module 153 and the reference number exceeds the upper limit number, the image generating module 152 may stop conveying and imaging the medium, and omit generating an input image. In that case, the image generating module 152 notifies the user of a warning by displaying information indicating that an abnormality has occurred to the display device 106 or transmitting the information to the information processing device via the display or interface device 133. Thus, the image generating module 152 can notify the user of the warning when the rotation speed of the DC motor 121 is slowed so that the input image cannot be suitably generated.

Figure 12:
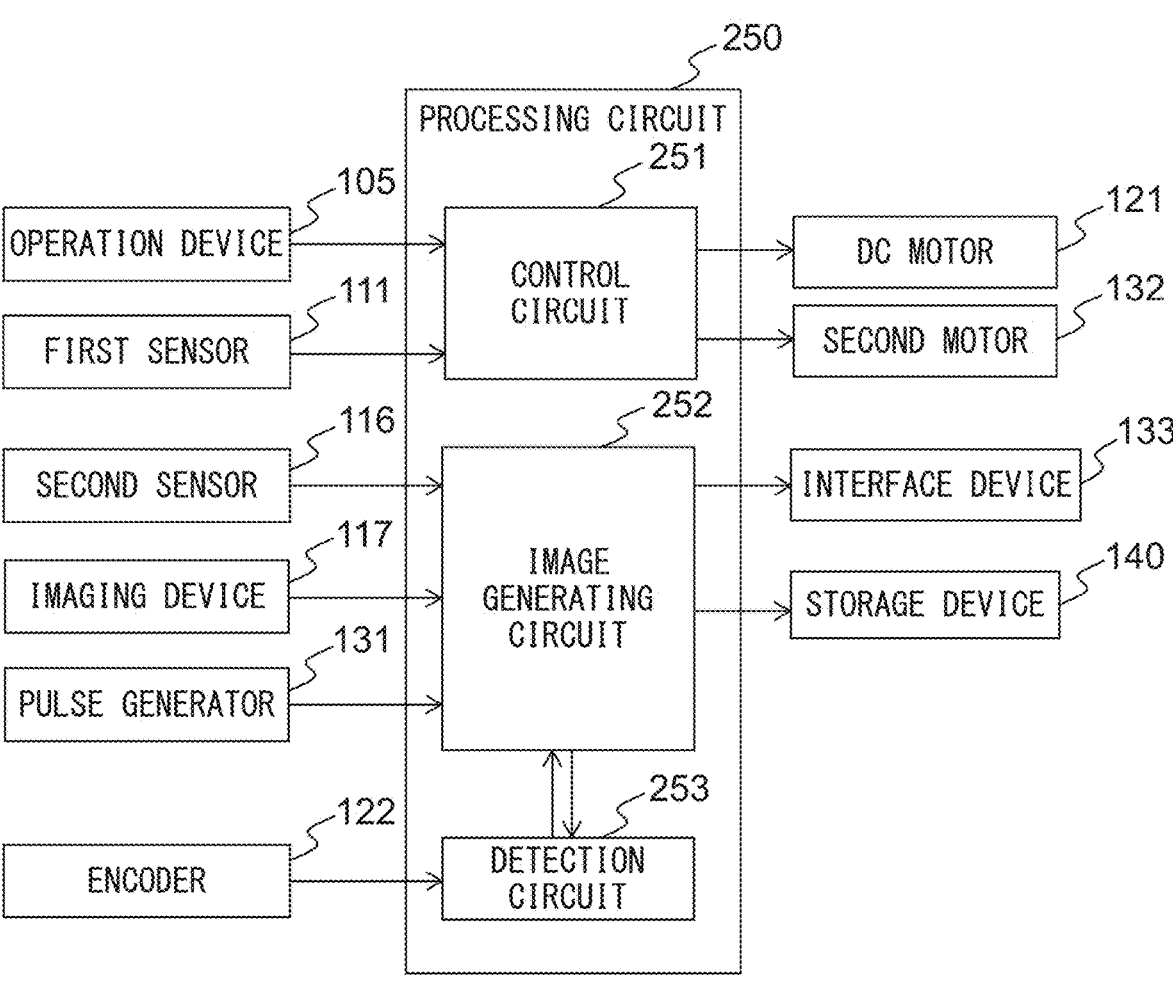
FIG. 12 is a diagram illustrating a schematic configuration of another processing circuit 250.

FIG. 12 is a diagram illustrating a schematic configuration of a processing circuit 250 in a medium conveying apparatus according to another embodiment. The processing circuit 250 is used in place of the processing circuit 150 in the medium conveying apparatus 100 and executes the medium reading processing in place of the processing circuit 150. The processing circuit 250 includes a control circuit 251, an image generating circuit 252 and a detection circuit 253, etc. Note that each unit may be configured by an independent integrated circuit, a microprocessor, firmware, etc.

The control circuit 251 is an example of a control module and has a function similar to the control module 151. The control circuit 251 receives the operation signal from the operation device 105, the first medium signal from the first sensor 111, and outputs a control signal to the DC motor 121 and the second motor 132 to control the conveyance of the medium in response to the received signals.

The image generating circuit 252 is an example of an image generating module and has a functions similar to the image generating module 152. The image generating circuit 252 receives the second medium signal from the second sensor 116, the second pulse signal from the pulse generator 131, the detection result of the number of pulses of the second pulse signal included in each cycle of the first pulse signal from the detection circuit 253. The image generating circuit 252 acquires line images from the imaging device 117 or discards the acquired line images in response to the received information, generates the input image, and transmits the generated input image to the information processing apparatus via the interface device 133 or stores it in the storage device 140. Further, the image generating circuit 252 outputs the number of pulses of the second pulse signal received in a predetermined cycle to the detection circuit 253.

The detection circuit 253 is an example of a detection module, and has a functions similar to the detection module 153. The detection circuit 253 receives the first pulse signal from the encoder 122, the number of pulses of the second pulse signal from the image generating circuit 252, detects the number of pulses of the second pulse signal included in each cycle of the first pulse signal based on the received information. The detection circuit 253 outputs the detection result to the image generating circuit 252.

As described in detail above, the medium conveying apparatus can suitably control the feeding of the medium, even when using the processing circuit 250.

According to the embodiment, the medium conveying apparatus, the method, and the computer-readable, non-transitory medium storing the control program, can more easily generate an appropriate image in the medium conveying apparatus for conveying the medium using the DC motor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
a conveyance roller to convey a medium;
a DC motor to drive the conveyance roller;
an imaging sensor to acquire images of the conveyed medium, and
circuitry configured to combine the images acquired by the imaging sensor to generate an input image; wherein
the circuitry generates the input image by thinning at least one of the images acquired by the imaging sensor at a timing when a front end part, a rear end part or a part at which a thickness changes of the conveyed medium passes the conveyance roller.

2. The medium conveying apparatus according to claim 1, wherein the medium is a thick paper, a card, a booklet, or a passport.

3. The medium conveying apparatus according to claim 1, further comprising an encoder to output a first pulse signal whose cycle changes according to a rotation speed of the DC motor, wherein
the circuitry thins at least one of the images acquired by the imaging sensor based on the first pulse signal.

4. The medium conveying apparatus according to claim 3, wherein
the imaging sensor acquires the images of the conveyed medium in response to pulses of a second pulse signal whose cycle is constant, and wherein the circuitry thins at least one of the images acquired by the imaging sensor based on the first pulse signal and the second pulse signal.

5. The medium conveying apparatus according to claim 4, wherein the circuitry detects a number of pulses of the second pulse signal included in a predetermined cycle of the first pulse signal, and wherein the circuitry thins at least one of the images acquired by the imaging sensor when the detected number of pulses exceeds a reference number.

6. The medium conveying apparatus according to claim 5, wherein when the detected number of pulses exceeds the reference number, the circuitry thins the images acquired by the imaging sensor by a number equal to a difference between the detected number of pulses and the reference number in a next cycle of the predetermined cycle of the first pulse signal.

7. The medium conveying apparatus according to claim 6, wherein the circuitry thins at least one of the images intermittently in the next cycle.

8. The medium conveying apparatus according to claim 3, wherein the circuitry controls a rotation speed of the DC motor so that the cycle of the first pulse signal follows a command value.

9. A method for generating an image, comprising:

conveying a medium by a conveyance roller;

driving the conveyance roller by a DC motor;

acquiring images of the conveyed medium by an imaging sensor; and combining the images acquired by the imaging sensor to generate an input image, wherein the input image is generated by thinning at least one of the images acquired by the imaging sensor at a timing when a front end part, a rear end part or a part at which a thickness changes of the conveyed medium passes the conveyance roller.

10. The method according to claim 9, wherein the medium is a thick paper, a card, a booklet, or a passport.

11. The method according to claim 9, further comprising outputting a first pulse signal whose cycle changes according to a rotation speed of the DC motor by an encoder, wherein at least one of the images acquired by the imaging sensor is thinned based on the first pulse signal.

12. The method according to claim 11, wherein the imaging sensor acquires the images of the conveyed medium in response to pulses of a second pulse signal whose cycle is constant, and wherein at least one of the images acquired by the imaging sensor is thinned based on the first pulse signal and the second pulse signal.

13. The method according to claim 12, further comprising detecting a number of pulses of the second pulse signal included in a predetermined cycle of the first pulse signal, wherein at least one of the images acquired by the imaging sensor is thinned when the detected number of pulses exceeds a reference number.

14. The method according to claim 13, wherein when the detected number of pulses exceeds the reference number, the images acquired by the imaging sensor is thinned by a number equal to a difference between the detected number of pulses and the reference number in a next cycle of the predetermined cycle of the first pulse signal.

15. A computer-readable, non-transitory medium storing executable instructions for generating an image, the executable instructions comprising:

combining images acquired by an imaging sensor to generate an input image of a medium conveyed by a conveyance roller driven by a DC motor, wherein the input image is generated by thinning at least one of the images acquired by the imaging sensor at a timing when a front end part, a rear end part or a part at which a thickness changes of the conveyed medium passes the conveyance roller.

16. The computer-readable, non-transitory medium according to claim 15, wherein the medium is a thick paper, a card, a booklet, or a passport.

17. The computer-readable, non-transitory medium according to claim 15, wherein at least one of the images acquired by the imaging sensor is thinned based on a first pulse signal whose cycle changes according to a rotation speed of the DC motor, outputted by an encoder.

18. The computer-readable, non-transitory medium according to claim 17, wherein the imaging sensor acquires the images by imaging the conveyed medium in response to pulses of a second pulse signal whose cycle is constant, and wherein at least one of the images acquired by the imaging sensor is thinned based on the first pulse signal and the second pulse signal.

19. The computer-readable, non-transitory medium according to claim 18, wherein the executable instructions further comprise detecting a number of pulses of the second pulse signal included in a predetermined cycle of the first pulse signal, wherein at least one of the images acquired by the imaging sensor is thinned when the detected number of pulses exceeds a reference number.

20. The computer-readable, non-transitory medium according to claim 19, wherein when the detected number of pulses exceeds the reference number, the images acquired by the imaging sensor is thinned by a number equal to a difference between the detected number of pulses and the reference number in a next cycle of the predetermined cycle of the first pulse signal.

* * * * *